United States Patent [19]

Talwar

[11] Patent Number: 4,952,193
[45] Date of Patent: Aug. 28, 1990

[54] INTERFERENCE CANCELLING SYSTEM AND METHOD

[75] Inventor: Ashok K. Talwar, Westlake Village, Calif.

[73] Assignee: American Nucleonics Corporation, West Lake Village, Calif.

[21] Appl. No.: 317,923

[22] Filed: Mar. 2, 1989

[51] Int. Cl.$^5$ ............................................. H04B 1/10
[52] U.S. Cl. ...................................... 455/63; 455/67; 455/295
[58] Field of Search ...................... 455/63, 67, 9, 295, 455/296, 302–306, 278; 375/99, 102

[56] References Cited

U.S. PATENT DOCUMENTS

| | | | |
|---|---|---|---|
| 3,699,444 | 10/1972 | Ghose et al. | 455/304 |
| 4,560,945 | 12/1985 | Olver | 455/63 |
| 4,577,330 | 3/1986 | Kavehiad | 455/295 |
| 4,684,989 | 8/1987 | Roeder et al. | 455/63 |
| 4,736,453 | 5/1988 | Scloemer | 455/67 |
| 4,736,455 | 4/1988 | Matsue et al. | 455/278 |

Primary Examiner—Robert L. Griffin
Assistant Examiner—Curtis Kuntz
Attorney, Agent, or Firm—Hoffmann & Baron

[57] ABSTRACT

An interference cancelling system for cancelling or minimizing multiple signal components of a received signal in a radio receiver caused by an interfering signal from a radio transmitter which interfering signal follows multiple paths to the radio receiver includes a directional coupler which samples the interfering signal transmitted from the radio transmitter and provides a primary sample signal, a transmission link which defines a primary sample signal path from the radio transmitter to the radio receiver, a power splitter for dividing a portion of the primary sample signal path into a plurality of secondary sample signal paths, a power combiner for combining the plurality of secondary sample signal paths back into the primary signal path, and a 180° hybrid coupled to the primary sample signal path and to the radio receiver. The secondary sample signal paths include delay lines and attenuator pads. The power combiner has an output which provides an adjusted primary sample having signal components corresponding to the secondary sample signals that are substantially equal in amplitude and time delay to the corresponding multiple signal components of the received signal caused by the interfering signal. The hybrid subtracts the adjusted primary sample signal from the received signal so that the signal components of the adjusted primary sample signal cancel or at least minimize the corresponding multiple signal components of the received signal caused by the interfering signal.

10 Claims, 3 Drawing Sheets

MHz FROM CENTER FREQUENCY

INTERFERENCE CANCELLING SYSTEM AND METHOD

BACKGROUND OF THE INVENTION

1. Field of the Invention

This invention relates to radio communication systems and methods, and more particularly relates to interference cancelling systems and methods for minimizing or eliminating interference in radio receivers due to unwanted signals. Even more specifically, this invention relates to an interference cancelling system and method for minimizing an interfering signal which arrives at the radio receiver through multiple paths due to reflections or when the receiving antenna system is an array.

2. Description of the Prior Art

FIG. 1 is a block diagram of a conventional interference cancelling system. The desired signal $S_D$ received by a receiving antenna 2 coupled to a radio receiver 4 is contaminated or interfered with by an interference signal $S_I$ transmitted by transmitter 6 through transmit antenna 8. In accordance with conventional techniques, a sample of the interference signal $S_I$ is taken at Location A by using a directional coupler 10 or power splitter or, alternatively, by using a directive antenna (not shown), especially if the transmitter is remotely located from the receiver. The sample signal $S_s$ is provided by transmission link 12 to subtractor means 14, such as a 180° hybrid or the like, at Location B, where it is subtracted with equal amplitude from the signal $S_R$ received by the receiver 4, thereby nulling the interference signal's effect on the received signal $S_R$.

In order for the cancellation to take place, the sample signal $S_s$ must arrive at Location B in the same phase as the interference signal $S_I$. Such can be achieved with a variable phase shifter (not shown) in series with the transmission link 12 which defines the sample signal path between Locations A and B. However, if this phase relationship is to be attained over a defined bandwidth, then the time delay between Locations A and B in the interference path (that is, the path which interference signal $S_I$ follows) must be matched by the time delay in the sample path (i.e. between Locations A and B). A time mismatch of $\Delta T$ will cause a phase difference, $\Delta \phi$, given by the following equation:

$$\Delta\phi = 2 \times \pi \times F_o \times \Delta T$$

where $F_o$ is the frequency of the interference signal $S_I$ and $\pi$ is approximately equal to 3.14. As stated above, the overall phase difference $\Delta\phi$ can be made to approach zero by using a phase shifter in the sample signal path.

However, at another frequency, F, there will still be a phase difference, as shown in the following equation:

$$\Delta\phi = 2 \times \pi(F - F_o) \times \Delta T$$

Even though good cancellation may be achieved at frequency $F_0$, the cancellation may be only partial at frequency F, or there may be no cancellation or even an enhancement of the interference signal $S_I$ received by the radio receiver.

This is illustrated by FIG. 2, which is a graph of the degree of cancellation as a function of frequency for a time mismatch of 1.0 nsec, as well as for 0.1 nsec. In the example shown in FIG. 2, the phase has been adjusted so that at frequency $F_0$, full cancellation of the unwanted signal, interference signal $S_I$, occurs. At frequencies away from $F_0$, the degree of cancellation is reduced. For example, at about 160 MHz or more from frequency $F_0$, the interference signal $S_I$ is actually enhanced when the time mismatch is 1.0 nsec or greater. Accordingly, it is essential that there be a time match apart from amplitude match in achieving a high degree of cancellation across a defined bandwidth in an interference cancelling system. Such time match is achieved by using an attenuating means 16, such as a pad, and a delay line 18, both being in series with the sample path defined by the transmission link 12 between Locations A and B, as shown in FIG. 1.

A problem occurs when the interference signal $S_I$ follows multiple paths, which can occur due to reflections or when the receiving antenna system is an array. The interference signal $S_I$ is received by the radio receiver after multiple time delays and generally in different strengths due to the multiple paths that it follows. In such a case, the bandwidth of the interference cancelling system can be greatly degraded, since no single delay line and single attenuator can simulate multipath effects. A similar situation occurs when the receiving antenna system is an array whose elements are usually not time-matched with respect to the source of interference.

OBJECTS AND SUMMARY OF THE INVENTION

It is an object of the present invention to provide an interference cancelling system which is adapted to minimize or eliminate unwanted signals arriving at a radio receiver through multiple paths.

It is another object of the present invention to provide a method for cancelling multipath interference signals.

It is yet a further object of the present invention to provide an interference cancelling system and method which overcomes the inherent disadvantages of known interference cancelling systems and methods.

In accordance with one form of the present invention, an interference cancelling system for cancelling or minimizing multiple signal components of a received signal in a radio receiver caused by an interfering signal which follows multiple paths to the radio receiver includes a sampling device, such as a directional coupler, for sampling the interfering signal transmitted from a radio transmitter. The sampling device has an output and provides on the output a primary sample signal corresponding to the interfering signal sampled.

The interference cancelling system of the present invention also includes a communications link between the radio transmitter and the radio receiver, which link defines a primary sample signal path.

Furthermore, a dividing device is included, which device acts to divide at least a portion of the primary sample signal path into a plurality of secondary sample signal paths. The number of secondary sample signal paths corresponds to at least the number of multiple paths which the interfering signal follows to the radio receiver. The dividing device divides the primary sample signal into a plurality of secondary sample signals, each secondary sample signal following a corresponding secondary sample signal path.

At least one of the secondary sample signal paths is provided with a delay adjusting device, such as a delay line, for adjusting the time delay of the secondary sample signal on the particular path having that delay device. Also, at least one of the secondary sample signal paths is provided with an amplitude adjusting device, such as an attenuating pad, for adjusting the amplitude of the secondary sample signal on the path having the amplitude adjusting device.

Each of the secondary sample signals corresponds to one of the multiple components of the received signal caused by the multipath interfering signal.

The interference cancelling system of the present invention further includes a combining device, such as a power combiner, for combining the plurality of secondary sample signal paths back into the primary signal path. The combining device includes an output and provides on the output an adjusted primary sample signal having signal components corresponding to the secondary sample signals.

The delay device and the amplitude adjusting device of the secondary sample signal paths are adjusted so that the signal components of the adjusted primary sample signal substantially equal in amplitude and in time delay the corresponding multiple signal components of the received signal caused by the interfering signal.

The interference cancelling system of the present invention further includes a subtracting device, such as a 180° degree hybrid, which is coupled to the primary sample signal path. The subtracting device acts to subtract the adjusted primary sample signal from the received signal of the radio receiver. This causes the signal components of the adjusted primary sample signal to cancel or at least minimize the corresponding multiple signal components of the received signal caused by the interfering signal.

In accordance with the present invention, a method for cancelling or minimizing multiple signal components in a radio receiver caused by an interfering signal which follows multiple paths to the radio receiver includes the steps of sampling the interfering signal transmitted from a radio transmitter, and providing a primary sample signal corresponding to the interfering signal sampled. Also, a primary sample signal path is provided from the radio transmitter to the radio receiver.

The method further includes the step of dividing at least a portion of the primary sample signal path into a plurality of secondary sample signal paths, where the number of secondary sample signal paths corresponds to at least the number of multiple paths which the interfering signal follows to the radio receiver. The primary sample signal is thus divided into a plurality of secondary sample signals, each secondary sample signal following a corresponding secondary sample signal path. Each of the secondary sample signals corresponds to one of the multiple components of the received signal caused by the multipath interfering signal.

The method of the present invention further includes the steps of adjusting the time delay of at least one of the secondary sample signals, as well as adjusting the amplitude of at least one of the secondary sample signals.

Further, in accordance with the method, the plurality of secondary sample signal paths are combined back into the primary signal path, and an adjusted primary sample signal having signal components corresponding to the secondary sample signals is provided.

The secondary sample signals are adjusted in time delay and in amplitude such that the signal components of the adjusted primary sample signal substantially equal in amplitude and time delay the corresponding multiple signal components of the received signal caused by the interfering signal.

The method further includes the step of subtracting the adjusted primary sample signal from the received signal. This causes the signal components of the adjusted primary sample signal to cancel or minimize the corresponding multiple signal components of the received signal caused by the interfering signal.

It is envisioned to be within the scope of the present invention to have a series of directional couplers sampling the interfering signal and connected directly to each of the secondary sample signal paths and, accordingly, to eliminate the need for a power splitter dividing the primary sample signal path into the plurality of secondary sample signal paths.

Similarly, it is also envisioned to include a plurality of 180° hybrids, each being connected to the end of a corresponding secondary sample signal path, such that each adjusted secondary sample signal (that is, adjusted in time delay and amplitude) may be directly subtracted from the received signal of the radio receiver, thus eliminating the need for a power combiner which combines the secondary sample signal paths back into the primary sample signal path.

These and other objects, features and advantages of this invention will become apparent from the following detailed description of illustrative embodiments thereof, which is to be read in connection with the accompanying drawings.

DETAILED DESCRIPTION OF THE PREFERRED EMBODIMENTS

Figure 3:
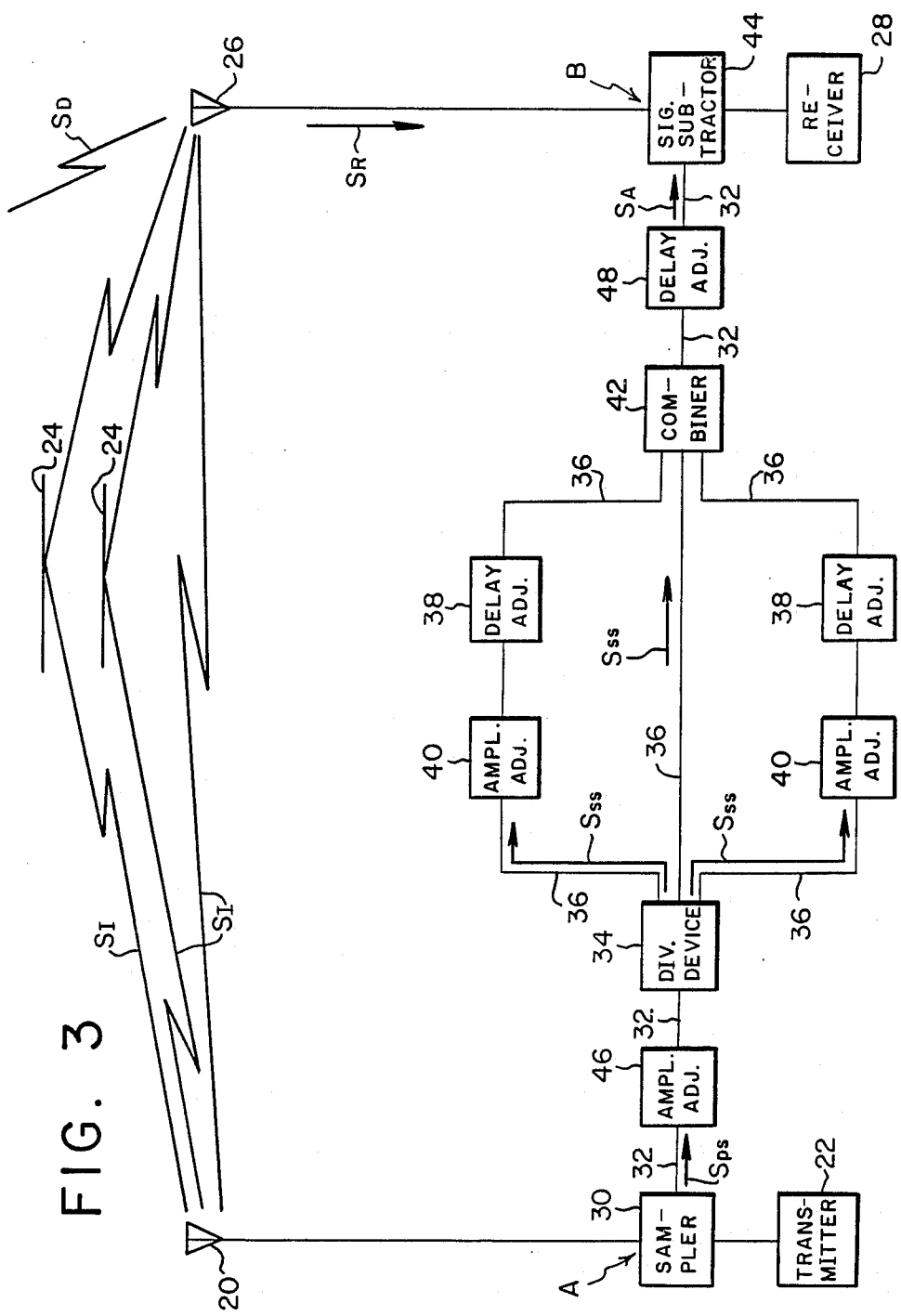
FIG. 3 is a block diagram illustrating one form of the present invention.

FIG. 3 illustrates one form of the present invention in which an interfering signal $S_I$ from a transmit antenna 20 connected to a transmitter 22 follows multiple paths due to reflections caused by reflectors 24, for example, atmospheric conditions, buildings, or the like, to a receive antenna 26 of a radio receiver 28.

In accordance with the present invention, a signal sampler 30, such as a directional coupler, is used to sample the interfering signal $S_I$ transmitted from the radio transmitter 22, although other types of sampling devices may be used. In the situation illustrated by FIG. 3, the interfering transmit antenna 20 and transmitter 22 are relatively proximately located with respect to the receive antenna 26 and radio receiver 28. Accordingly, a directional coupler 30 may be used to tap the radio transmitter's output to the transmit antenna 20 to obtain a sample of the interfering signal $S_I$. However, for a transmit antenna 20 and transmitter 22 which are remotely located with respect to the receive antenna 26 and radio receiver 28, it is envisioned that a directive antenna (not shown) be used to sample the interfering signal transmitted from the transmit antenna.

The directional coupler 30 has an output on which is provided a primary sample signal $S_{ps}$, which signal corresponds to the interfering signal $S_I$ sampled.

A primary sample signal path 32 is established from the radio transmitter 22 at Location A to the radio receiver 28 at Location B. Such a sample signal path 32 may be provided by a communications link, such as a cable between Locations A and B. The primary sample signal $S_{ps}$ follows the primary sample signal path 32.

A power splitter or other dividing device 34 is used for dividing at least a portion of the primary sample signal path 32 into a plurality of secondary sample signal paths 36. The power splitter 34 includes a series of outputs, each of which is connected to a secondary sample signal path 36. The number of secondary sample signal paths 36 corresponds to at least the number of multiple paths which the interfering signal $S_I$ follows to the radio receiver 28. In the example shown in FIG. 3, there are three paths which the interfering signal $S_I$ follows to the radio receiver—two such paths are established due to reflections, and a third path is caused by a direct transmission from the interfering transmit antenna 20 to the receive antenna 26. Accordingly, in the example illustrated, three secondary sample signal paths 36 are provided. The primary sample signal $S_{ps}$ is divided by the power splitter 34 into a plurality of secondary sample signals $S_{ss}$, each secondary sample signal following a corresponding secondary sample signal path 36.

At least one of these secondary sample signal paths is provided with a delay adjusting device 38, such as a delay line, for adjusting the time delay of the secondary sample signal $S_{ss}$ of the path having the delay line. In the example illustrated by FIG. 3, two of the three secondary signal paths 36 are provided with delay lines.

Furthermore, at least one of the secondary sample signal paths 36 are provided with an amplitude adjusting device 40, such as an attenuating pad, for adjusting the amplitude of the secondary sample signal $S_{ss}$ following the path having the amplitude adjusting device 40. In the example illustrated by FIG. 3, the same two secondary signal paths 36 having delay lines 38 also include an amplitude adjuster 40 in series with the delay lines.

The plurality of secondary sample signal paths 36 are now combined back into the primary signal path 32 by a power combiner 42 or the like. The power combiner 42 includes several input terminals, each connected to a corresponding secondary signal path 36, and an output connected to the primary sample signal path 32. On the output of the power combiner, an adjusted primary sample signal $S_A$ is provided. The adjusted primary sample signal $S_A$ has signal components which correspond to the secondary sample signals $S_{ss}$, adjusted in time and amplitude.

Each of the secondary sample signals $S_{ss}$ correspond to one of the multiple components of the received signal $S_R$ caused by the multipath interfering signal $S_I$. As mentioned previously, in the example shown in FIG. 3, the interfering signal follows three paths to the receive antenna 26. Accordingly, three secondary sample signals $S_{ss}$ are provided on the secondary signal paths 36, and at least two of the secondary signals are adjusted in time and in amplitude. The three signals $S_{ss}$ are then combined by the power combiner 42 into an adjusted primary sample signal $S_A$.

The delay lines 38 and amplitude adjusters 40 of the secondary sample signal paths 36 are adjusted such that the signal components of the adjusted primary sample signal $S_A$ substantially equal in amplitude and time delay the corresponding multiple signal components of the received signal $S_R$ caused by the interfering signal $S_I$.

A signal subtractor 44, such as a 180° hybrid, is then used to subtract the adjusted primary sample signal $S_A$ from the received signal $S_R$. The signal subtractor 44 is coupled to the primary signal path 32 and to the radio receiver 28. The signal components of the adjusted primary sample signal $S_A$, which substantially equal in amplitude and time delay the corresponding multiple signal components of the received signal $S_R$ caused by the interfering signal $S_I$, thus cancel or at least minimize the multiple signal components of the received signal, leaving the desired signal $S_D$ received by the radio receiver free of the unwanted interfering signal.

In the example illustrated by FIG. 3, one of the secondary sample signal paths 36 does not include a delay line 38 or amplitude attenuator 40, although it is envisioned that all of the secondary signal paths may incorporate such devices. In the situation where at least one of the secondary signal paths do not incorporate an amplitude attenuator and a delay line, such may be included in the primary sample signal path 32. As illustrated by FIG. 3, an amplitude adjuster 46, such as an attenuating pad, is disposed in the primary sample signal path 32 between the directional coupler 30 and the power splitter 34. Also, a delay line 48 may be disposed in the primary sample signal path 32 between the power combiner 42 and the signal subtractor 44. Of course, the delay line 48 and amplitude adjuster 46 may be positioned together in series in any portion of the primary sample signal path 32 or may have their positions described above and shown in FIG. 3 reversed. The amplitude adjuster 46 and delay line 48 will affect not only the secondary sample signal path having no such devices, but also all of the other secondary sample signal paths having such devices. The amplitude adjusters 40, 46 are used to account for the different signal strengths received via the various paths which the interfering signal $S_I$ follows. The additional delay line 48 is used before the power splitter 34 or after the combiner 42 to account for additional differences in delay.

Figure 4:
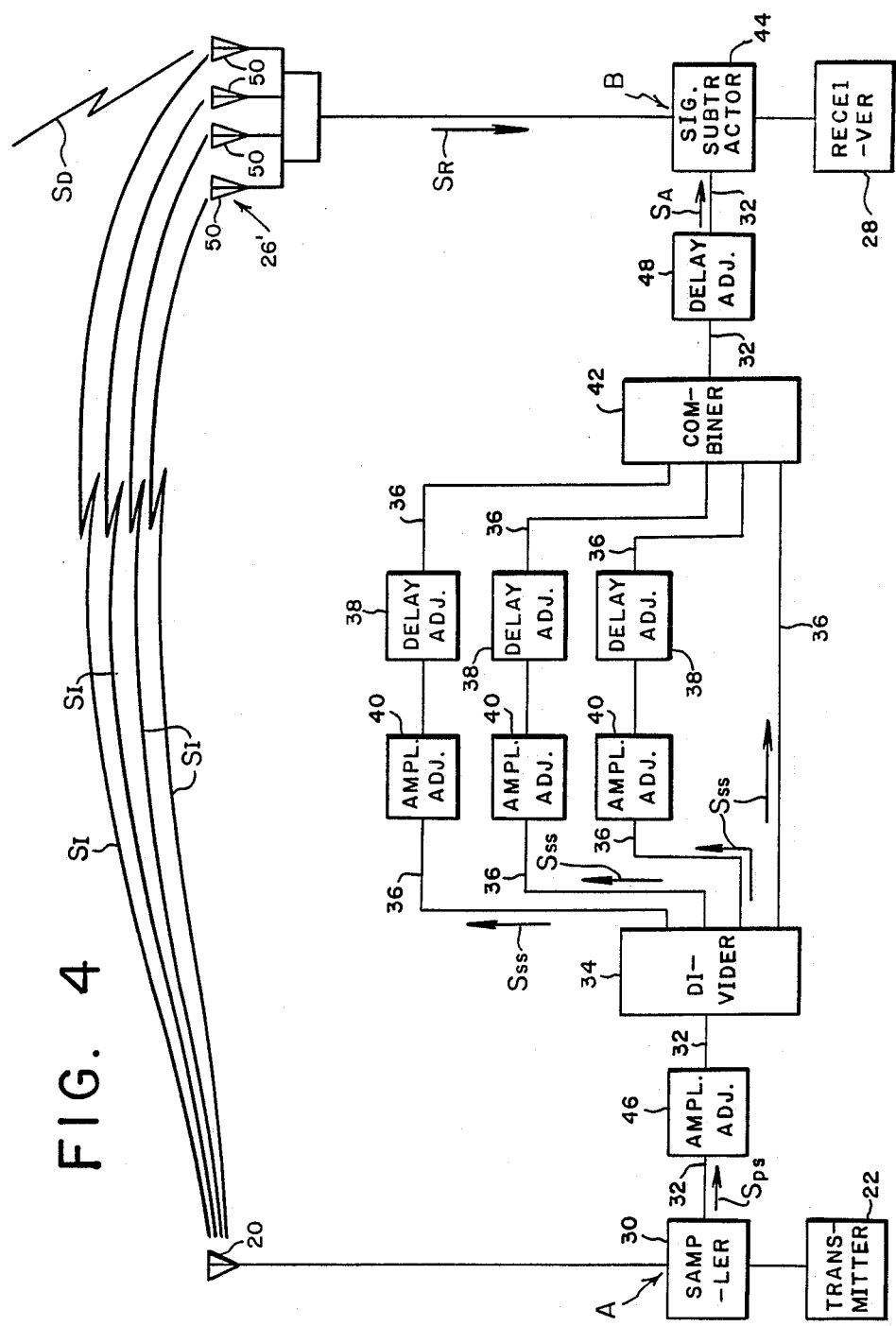
FIG. 4 is a block diagram illustrating the use of the embodiment of FIG. 3 with a receive antenna array.

FIG. 4 illustrates the interference cancelling system of FIG. 3 used in a situation where the radio receiver is connected to a receive antenna array 26'. Normally, the elements 50 of such a receive antenna array 26' are not time matched with respect to the source of interference. Accordingly, multipath effects will occur from an interfering transmit signal $S_I$ even if there are no reflections of the interfering signal.

As illustrated by FIG. 4, the receive antenna array 26' is comprised of four elements 50. Accordingly, the interfering signal $S_I$ follows four paths.

As shown in FIG. 4, four secondary sample signal paths 36 are provided between the power splitter 34 and the power combiner 42. Three of the secondary signal paths are provided with delay lines 38 and amplitude adjusters 40, and an amplitude adjuster 46 and delay line 48 are provided in the primary sample signal path 32.

Accordingly, each of the multiple signal components of the received signal $S_R$ in the radio receiver 28 caused by the interfering signal $S_I$ being received by the elements of the antenna array 26' will be cancelled or at least minimized by the corresponding signal components of the adjusted primary sample signal $S_A$ provided when the amplitude adjusted and time delay adjusted secondary sample signals $S_{ss}$ are combined by the power combiner 42 and the adjusted primary sample signal $S_A$ is subtracted from the received signal $S_R$ by the signal subtractor 44.

Figure 5:
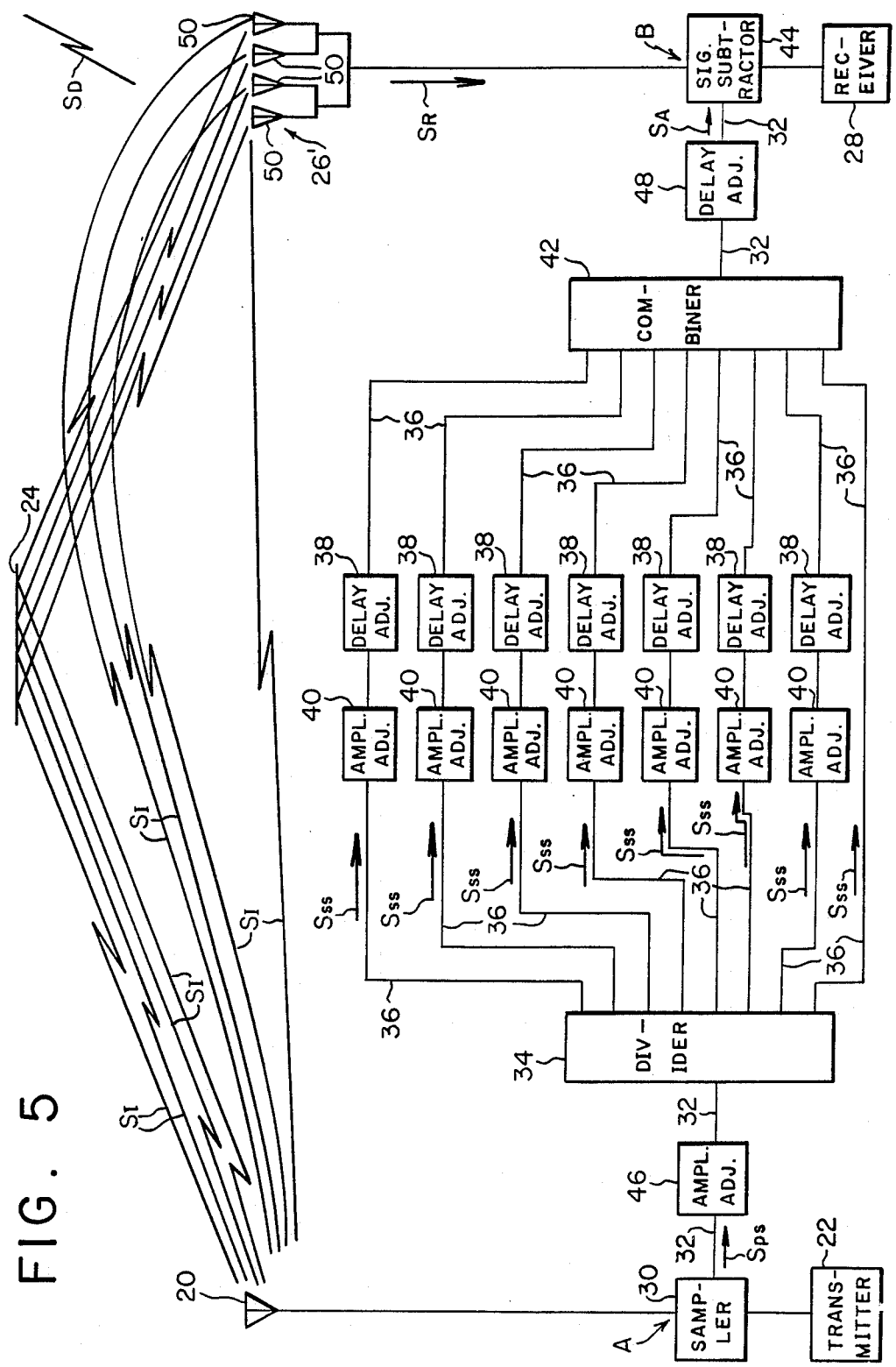
FIG. 5 is a block diagram illustrating the embodiments of FIGS. 3 and 4 in which the interfering signal follows multiple paths caused by reflection and due to the use of an antenna array at the receiver.

FIG. 5 illustrates a situation where an interfering signal is received through direct path to a receive antenna array 26', as well as after reflection from a surface 24.

As illustrated by FIG. 5, a four element receive antenna array 26' and a single reflective surface 24 may cause the interfering signal $S_I$ to follow about eight paths to the radio receiver 28. Accordingly, eight secondary signal paths $S_{ss}$ are provided between the power splitter 34 and the power combiner 42, seven of which have amplitude adjusters 40 and delay lines 38. Also, an amplitude adjuster 46 and a delay line 48 are positioned in the primary sample signal path 32, either between the directional coupler 30 and the power splitter 34 or the power combiner 42 and the signal subtractor 44. Adjustment of the amplitude adjusters 40, 46 and the delay lines 38, 48 in the primary sample signal path 32 and in the seven secondary sample signal paths 36 will provide an adjusted primary sample signal $S_A$ to the signal subtractor 44, which signal has components that are adjusted to equal in time and amplitude the multiple signal components of the receive signal $S_R$ caused by the interfering signal $S_I$ and the various paths that the interfering signal follows. Accordingly, the various components of the adjusted primary sample signal $S_A$ will cancel or at least minimize the corresponding interfering signal components of the received signal $S_R$, thus leaving the desired signal $S_D$ for further processing by the radio receiver 28.

In accordance with the method of the present invention, the interfering signal $S_I$ transmitted from a radio transmitter 22 is sampled using a device 30 such as a directional coupler or the like. A primary sample signal $S_{ps}$ is thus provided, which signal corresponds to the interfering signal sampled. A primary sample signal path 32 is established from the radio transmitter to the radio receiver.

At least a portion of the primary sample signal path is divided into a plurality of secondary sample signal paths 36. The number of secondary sample signal paths 36 corresponds to at least the number of multiple paths which the interfering signal $S_I$ follows to the radio receiver. A power splitter 34 may be used to divide the primary sample signal path 32 into the plurality of secondary sample signal paths 36. The primary sample signal $S_{ps}$ is divided accordingly into a plurality of secondary sample signals $S_{ss}$, each secondary sample signal following a corresponding secondary sample signal path 36. Each of the secondary sample signals $S_{ss}$ corresponds to one of the multiple components of the received signal $S_R$ caused by the multipath interfering signal $S_I$.

The plurality of secondary sample signal paths 36 are combined into the primary sample signal path 32 again such as by using a power combiner 42, and an adjusted primary sample signal $S_A$ is provided having signal components corresponding to the secondary sample signals $S_{ss}$.

One or more of the secondary sample signals $S_{ss}$ are adjusted in time delay and in amplitude so that the signal components of the adjusted primary sample signal $S_A$ substantially equal in amplitude and time delay the corresponding multiple signal components of the received signal $S_R$ caused by the interfering signal $S_I$.

The adjusted primary sample signal $S_A$ is subtracted from the received signal $S_R$ so that the signal components of the adjusted primary sample signal cancel or at least minimize the corresponding multiple signal components of the received signal caused by the interfering signal $S_I$.

The primary sample signal $S_{ps}$ or the adjusted primary sample signal $S_A$ may be further adjusted in amplitude and in time delay by using an additional amplitude adjuster 46 or delay line 48 in series with the primary sample signal path 32.

In some situations, it may not be easy to measure the multipath effects directly. In such cases, a measurement of phase versus frequency can be made in the external path. A number of cables and attenuators can then be modeled in a fashion described previously and the cable lengths and attenuation values optimized on a computer until the phase versus frequency characteristic matches that of the external path. In this way no direct knowledge of the external multipath delays and relative signal strengths is required.

Figure 1:
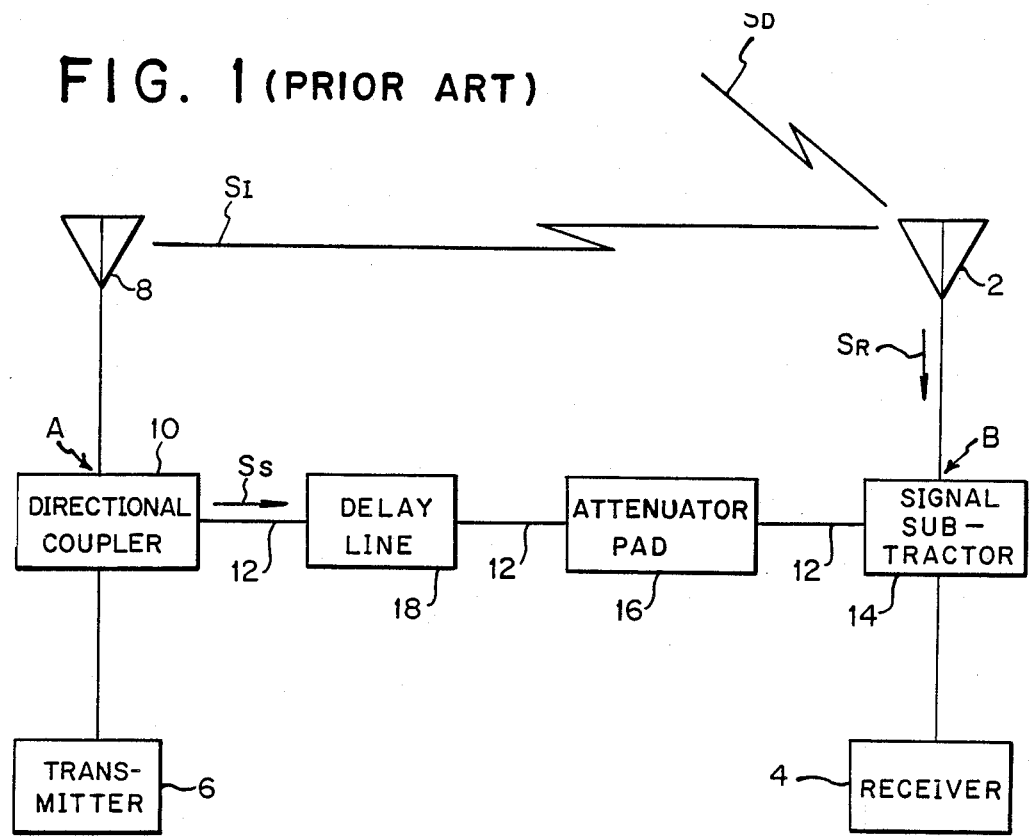
FIG. 1 is a block diagram of a conventional interference cancelling system.
Figure 2:
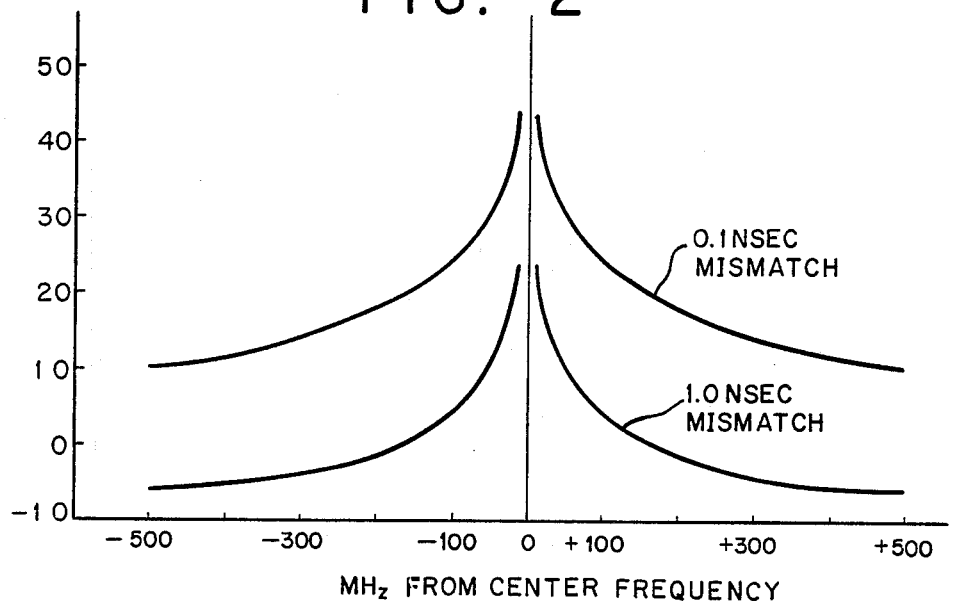
FIG. 2 is a graph depicting the relationship between the degree of cancellation and the affect on such cancellation caused by a change in the frequency of the interfering signal and the time difference or mismatch between the interfering signal path between transmitter and receiver and the cancellation sample signal path.

The present invention is particularly adapted for cancelling the multipath effects of an interfering signal having a waveform other than a sine wave, although it can easily handle a sine waveform. It is commonly understood that when two sine wave signals with different phase and amplitude are combined, the result is still a sine wave signal. In such a case, with appropriate adjustment of amplitude and phase, the combined waveform can be duplicated by the sine wave signal sampled from the transmitter. However, when two square wave signals, for example, of different amplitude and phase but with the same frequency are combined, as might happen when a directly-transmitted signal and the same signal after reflection are received by a radio receiver, the resultant waveform might no longer be a square wave. Accordingly, a signal sampled from the transmitter may not be used to cancel such interference if applied to the signal subtractor in the conventional manner shown in FIG. 1. However, such a complex signal can be duplicated in the sample path of the interference cancellation system of the present invention, making cancellation or at least minimization of such an interfering signal received by a radio receiver possible.

Although illustrative embodiments of the present invention have been described herein with reference to the accompanying drawings, it is to be understood that the invention is not limited to those precise embodiments, and that various other changes and modifications may be effected therein by one skilled in the art without departing from the scope or spirit of the invention.

What is claimed is:

1. An interference cancelling system for cancelling or minimizing multiple signal components of a received signal in a radio receiver caused by an interfering signal from a radio transmitter, which interfering signal follows multiple paths to the radio receiver, which comprises:

sampling means for sampling the interfering signal transmitted from the radio transmitter, the sampling means having an output and providing on the output a primary sample signal corresponding to the interfering signal sampled;

means for providing a primary sample signal path from the radio transmitter to the radio receiver;

dividing means for dividing at least a portion of the primary sample signal path into a plurality of secondary sample signal paths, the number of secondary sample signal paths corresponding to at least the number of multiple paths which the interfering signal follows to the radio receiver, the primary sample signal being divided into a plurality of secondary sample signals, each secondary sample signal following a corresponding secondary sample signal path;

at least one of the secondary sample signal paths being provided with delay adjusting means for adjusting the time delay of the secondary sample signal of said at least one path having said delay adjusting means;

at least one of the secondary sample signal paths being provided with amplitude adjusting means for adjusting the amplitude of the secondary sample signal of said at least one path having said amplitude adjusting means;

each of the secondary sample signals corresponding to one of the multiple components of the received signal caused by the multipath interfering signal;

combining means for combining the plurality of secondary sample signal paths into said primary sample signal path, the combining means including an output and providing on the output an adjusted primary sample signal having signal components corresponding to the secondary sample signals;

the delay adjusting means and amplitude adjusting means of the secondary sample signal paths being adjusted such that the signal components of the adjusted primary sample signal substantially equal in amplitude and time delay the corresponding multiple signal components of the received signal caused by the interfering signal; and subtracting means coupled to the primary sample signal path for subtracting the adjusted primary sample signal from the received signal, whereby the signal components of the adjusted primary sample signal cancel or minimize the corresponding multiple signal components of the received signal caused by the interfering signal.

2. An interference cancelling system as defined by claim 1, wherein the sampling means includes a directional coupler.

3. An interference cancelling system as defined by claim 1, wherein the dividing means includes a power splitter having a plurality of outputs, each output being coupled to a corresponding secondary sample signal path.

4. An interference cancelling system as defined by claim 1, wherein the combining means includes a power combiner having a plurality of inputs, each input being coupled to a corresponding secondary sample signal path.

5. An interference cancelling system as defined by claim 1, wherein the amplitude adjusting means of each secondary sample signal path includes an attenuating pad.

6. An interference cancelling system as defined by claim 1, wherein the delay means of each secondary sample signal path includes a delay line.

7. An interference cancelling system as defined by claim 1, which further includes amplitude adjusting means for adjusting the amplitude of one of the primary sample signal and the adjusted primary sample signal, the amplitude adjusting means being disposed in the primary sample signal path between one of the sampling means and the dividing means, and the combining means and the subtracting means.

8. An interference cancelling system as defined by claim 1, which further comprises delay adjusting means for adjusting the time delay of one of the adjusted primary sample signal and the primary sample signal, the delay adjusting means being disposed in the primary sample signal path between one of the combining means and the subtracting means, and the sampling means and the dividing means.

9. An interference cancelling system for cancelling or minimizing multiple signal components of a received signal in a radio receiver caused by an interfering signal from a radio transmitter, which interfering signal follows multiple paths to the radio receiver, which comprises:

sampling means for sampling the interfering signal transmitted from the radio transmitter, the sampling means having a plurality of outputs and providing on the outputs a plurality of secondary sample signals, each secondary sample signal corresponding to the interfering signal sampled;

means for providing a plurality of secondary sample signal paths from the radio transmitter to the radio receiver, the number of secondary sample signal paths corresponding to at least the number of multiple paths which the interfering signal follows to the radio receiver, each secondary sample signal following a corresponding secondary sample signal path;

at least one of the secondary sample signal paths being provided with delay adjusting means for adjusting the time delay of the secondary sample signal of said at least one path having said delay adjusting means;

at least one of the secondary sample signal paths being provided with amplitude adjusting means for adjusting the amplitude of the secondary sample signal of said at least one path having said amplitude adjusting means;

each of the secondary sample signals corresponding to one of the multiple components of the received signal caused by the multipath interfering signal; and the delay adjusting means and amplitude adjusting means of the secondary sample signal paths being adjusted such that the secondary sample signals substantially equal in amplitude and time delay the corresponding multiple signal components of the received signal caused by the interfering signal; and subtracting means coupled to the plurality of secondary sample signal paths for subtracting the secondary sample signals from the received signal, whereby the secondary sample signals cancel or minimize the corresponding multiple signal components of the received signal caused by the interfering signal.

10. A method of cancelling or minimizing multiple signal components of a received signal in a radio receiver caused by an interfering signal from a radio transmitter, which interfering signal follows multiple paths to the radio receiver, which comprises the steps of:

sampling the interfering signal transmitted from the radio transmitter, and providing a primary sample signal corresponding to the interfering signal sampled;

providing a primary sample signal path from the radio transmitter to the radio receiver;

dividing at least a portion of the primary sample signal path into a plurality of secondary sample signal paths, the number of secondary sample signal paths corresponding to at least the number of multiple paths which the interfering signal follows to the radio receiver, the primary sample signal being divided into a plurality of secondary sample signals, each secondary sample signal following a corresponding secondary sample signal path;

adjusting the time delay of at least one of the secondary sample signals;

adjusting the amplitude of at least one of the secondary sample signals;

each of the secondary sample signals corresponding to one of the multiple components of the received signal caused by the multipath interfering signal;

combining the plurality of secondary sample signal paths into said primary sample signal path, and providing an adjusted primary sample signal having signal components corresponding to the secondary sample signals;

the time delay and the amplitude of the secondary sample signals being adjusted such that the signal components of the adjusted primary sample signal substantially equal in amplitude and time delay the corresponding multiple signal components of the received signal caused by the interfering signal; and subtracting the adjusted primary sample signal from the received signal so as to cause the signal components of the adjusted primary sample signal to cancel or minimize the corresponding multiple signal components of the received signal caused by the interfering signal.

* * * * *